United States Patent [19]
Schoeler et al.

[11] Patent Number: 5,286,777
[45] Date of Patent: Feb. 15, 1994

[54] PREPARING A DYE-CONTAINING POLYMER

[75] Inventors: Ulrich Schoeler, Gerolzhofen; Peter Ast, Schoenaich; Eugene W. Reynolds, deceased, late of Schoenaich, all of Fed. Rep. of Germany, by Beverly D. Reynolds, Administrator; Darlene J. Spira-Solomon, Stanford, Calif.

[73] Assignee: Hewlett-Packard Company, Palo Alto, Calif.

[21] Appl. No.: 912,063

[22] Filed: Jul. 7, 1992 (Under 37 CFR 1.47)

Related U.S. Application Data

[63] Continuation of Ser. No. 306,951, Feb. 3, 1989, abandoned.

[51] Int. Cl.$^5$ .................... C08F 2/02; C08F 20/56; C08L 39/00; C08G 63/78
[52] U.S. Cl. ................... 524/460; 524/457; 524/458; 524/555; 526/303.1; 528/205
[58] Field of Search ............ 524/457, 458, 555, 715, 524/827, 829; 526/303.1; 528/205

[56] References Cited

FOREIGN PATENT DOCUMENTS 0246814 11/1987 European Pat. Off. ............ 524/458

Primary Examiner—Paul R. Michl
Assistant Examiner—Peter Szekely

[57] ABSTRACT

In a process for producing a dye-containing polymer to be used for spectroscopic sample analysis, monomers are polymerized in the presence of a dye to form a block of bulk polymer. The bulk polymer or slices thereof can be easily measured in a spectrometer in order to determine the spectroscopic properties of the dye containing polymer. The bulk polymer is subsequently ground to particles which can be used to fill a fiber optical sensor. Since the particles have the same optical properties as the bulk polymer, the properties of the particles of dye-containing polymer of the sensor can be accurately determined from the bulk polymer.

13 Claims, 1 Drawing Sheet

PREPARING A DYE-CONTAINING POLYMER

CROSS REFERENCE TO RELATED APPLICATION

This is a continuation of copending application Ser. No. 07/306,951 filed on Feb. 3, 1989, now abandoned.

BACKGROUND OF THE INVENTION

The invention relates to a method for the preparation of a dye-containing polymer to be used for the spectroscopic analysis of samples. Such dye containing polymers are used, for example, in fiber optical sensors for the determination of the pH value or of the concentration of oxygen or of the concentration of carbon dioxide in the blood of a patient.

A method of that kind is known from U.S. Pat. No. 4,194,877. In the known method an emulsion polymerization of acrylamide, bisacrylamide and a dye is per formed. In this known method, the dye/acryl/polymer composition is produced in the form of small spheres. Unfortunately, the small spheres produced by this method can have very different sizes and can have highly variable dye concentrations. This is particularly disadvantageous in applications (e.g. in pH measurements) where the dye-containing polymer needs to be as homogeneous as possible.

SUMMARY OF THE INVENTION

In accordance with the disclosed preferred embodiment of the invention, a method is presented for preparing dye-containing polymer particles having sufficiently uniform chemical and physical properties that they are useful in spectroscopic analysis. The dyed polymer is prepared as bulk polymer so that a chemically, optically and mechanically homogeneous material is obtained. Thin slices of the bulk material are analyzed to determine whether the optical, chemical and physical properties of the bulk gel are suitable for use, in powder form, in analytical sensors. The bulk polymer is ground by methods suitable for producing polymer particles which have the same optical, mechanical, and chemical properties as the bulk polymer from which they have been produced. In this manner, the properties of the dyed polymer are determined by the properties of the bulk polymer. These particles are then used in a spectroscopic sensor. It is a particular advantage of this method that, since the optical and mechanical properties of the polymer particles are determined by the properties of the bulk dye-containing polymer, those polymers that do not meet the requirements of the respective application can be easily detected and rejected. Thus, it can be ensured, for example, that, for different sensors, the respective dye-containing polymer fillings have substantially the same properties.

According to one embodiment of the invention, the thin sections, for analysis in a spectrometer, are cut from the same block of bulk dye-containing polymer as is ground to produce the polymer particles. The thin sections can be cut by use of a vibrating knife or by freezing the gel and then cutting the slices with microtomes.

In a second embodiment of the invention, a set of parallel plates are immersed in the monomer during polymerization. Thin coatings of the polymer form on the surfaces of these plates during the polymerization process. These thin coatings are used as thin slices of the polymer for use in analyzing the bulk polymer. Because these thin slices are formed from the same monomer source as is formed the bulk polymer, analysis of these thin polymer slices will also characterize the bulk polymer.

The most favorable method of grinding the bulk polymer to produce polymer particles depends on the consistency of the respectively produced polymers. In one embodiment of the invention, very soft materials are passed through a sieve to form an initial set of particles. This method is particularly suitable for solvatgels, e.g. for hydrogels. Desolvatization of the particles substantially reduces their volumes, resulting in very small particles having substantially equal sizes. A decrease in volume up to a factor of five hundred is possible. Brittle polymers can be pulverized to produce the powdered polymer.

The particles to be used in a sensor can be sorted according to their size in order to achieve a more uniform size distribution. This can be achieved by centrifuging, by sifting through a sieve or by air separation.

DESCRIPTION OF THE PREFERRED EMBODIMENT

Figure 1:
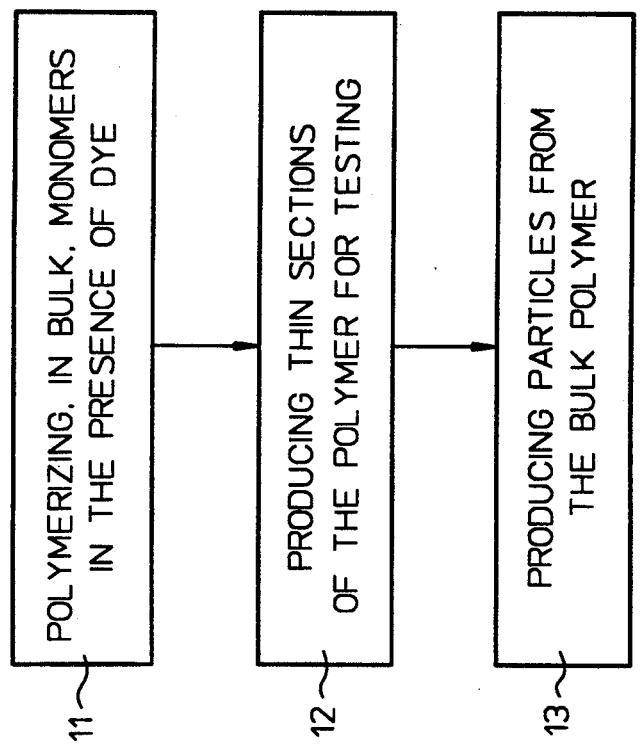

In FIG. 1 is presented a flow diagram of the steps used to produce dye-containing gel particles having the same chemical, physical and optical properties. In step 11, a monomer source containing a dye is polymerized to form a bulk polymer. In step 12, thin sections of the polymer are formed for testing to determine the optical, chemical and physical properties of the polymer. Particles of polymer are then formed from the bulk polymer.

PREPARATION

An empty test tube 180 mm long and 18 mm in diameter is evacuated in a splinter shield (e.g. in a plexiglass tube) to test it for vacuum stability. Specimen substrates 76 mm long and 26 mm wide are each divided into four equal parts and are carefully cleaned with HCl/HN03, H2O (water) and acetone. These substrates are exposed to dimethyl dichlorosilane vapor to make them hydrophobic. An alternating stack of specimen supports and 150 micrometer thick cover glass plates are tied together with a kevlar cord.

GEL SYNTHESIS 4.25 grams of acrylamide p.A., 90 mg of N,N'-methylene bisacrylamide p.A. and 50 mg of high purity phenol red are dissolved in 10 ml deionized water and 0.4 ml of a 6% (weight percentage) solution of water-temed ("temed" means tetramethyl ethylene diamine) and this solution is cooled to 0 degrees centigrade. Nitrogen gas is bubbled through this, solution to assist in dissolving 50 mg of $(NH_4)_2S_2O_8$ (p.A. ammonium persulphate) in the solution. The bundled stack of glass slides is immediately immersed into the solution. Nitrogen gas is introduced several times via a three way cock (Czako cock) and vacuum is applied to the solution, whereby the solution is brought to a boil, injecting the solution between the glass plates. Finally, nitrogen gas is introduced under a very low overpressure and the test tube is brought to 40 degrees Centigrade. After about a minute the solution gels. After an hour of synthesis time the test tube is cooled to zero degrees centigrade and is shattered. Most of the gel has formed into a clear intensively colored soft-elastic cylindrical block of bulk polymer. The stack of glass plates is separated under water, thereby producing 150 micrometer thick intensively yellow colored gel slices which are chemically, optically and mechanically homogeneous and which have an optically perfect smooth surface. The optical, chemical and mechanical properties of the gel slices are the same as for the cylindrical block of bulk polymer.

CHARACTERIZATION

Determination of Optical and Chemical Properties

After storage in water, the gel slices contain a lot of water so that the gel in these slices is in an expanded, hydrated state. These slices are put between two specimen supports with pH 12 buffer, and their thickness is reproducibly set to within 5 micrometers by means of a micrometer screw. The average thickness is approximately 200 micrometers. For the determination of the optical properties, detachable 500 micrometer (sample space) quartz cuvettes are utilized. The gel slices are measured in buffer pH 12, whereby, from the extinction spectrum, the following parameters are determined:

lambda: the exact wavelength of the absorption peak of the bonded dye;
$E_m$: the extinction factor at wavelength lambda of the gel slice of thickness d;
$E_s$: the specific extinction factor of the gel material; where $$E_s = E_m/d = e \cdot c$$

and where e is the extinction coefficient of the bonded dye and c is the concentration of the dye. The precision of the value of $E_s$ substantially depends on the precise thickness measurement of the gel slice. In calculating the concentration c of the phenol red from this relationship, the extinction coefficient e of the bonded dye can be approximated by the value of the extinction coefficient of the free dye.

PARTICLE FORMATION

Gel particles of definite size are produced in the following way. The cylindrical block of gel in the expanded state is comminuted to pieces of about 5 mm size, for example by crushing. These pieces are scraped with a metal spatula with excess water through a sieve. The sieve can be, for example, an analysis sieve having a mesh size of 20 micrometers. With this method of comminuting, it is easily possible to produce particles having a diameter of 20 micrometers or smaller in the hydrated state. After drying, the volume of these particles is reduced to about a tenth of their expanded volume. These small particles are then used to fill a sensor.

It should be understood that the invention is not limited to sensors for determining the pH value of samples, but can also be used for the production of other types of sensors such as sensors for measuring carbon dioxide concentration ($PCO_2$ sensors) or oxygen concentration ($PO_2$ sensors).

It is claimed:

1. A method of preparing particles of a dye-containing polymer comprising the steps of:
   polymerizing a solution of monomers in the presence of the dye to produce a homogenous bulk dye-containing polymer;
   forming slices from said polymer preparation for analysis of the properties of these slices; and
   dividing the bulk polymer into particles of dye-containing polymer.

2. A method as in claim 1, wherein said monomers to be polymerized are in an aqueous solution together with said dye.

3. A method as in claim 1, wherein said monomers to be polymerized are in an organic solvent together with said dye.

4. A method as in any of claims 1 wherein, during the step of polymerization, at least two parallel plates are immersed in the monomer solution for producing polymer slices containing the dye.

5. A method as in claim 1, wherein the step of forming slices comprises cutting from said block of bulk polymer at least one thin slice of bulk polymer for analysis of the properties of the bulk polymer.

6. A method as in claim 1 wherein, in the step of dividing the bulk polymer into particles, the bulk polymer is passed through a sieve.

7. A method as in claim 1 wherein the monomers are acrylamide and methylenebisacrylamide.

8. A method as in claim 1 wherein the dye is phenol red.

9. A method as in claim 1 further comprising the step of sorting the polymer particles by size.

10. A method as claim 1 wherein, in the polymerization step, the dye becomes irreversibly covalently bonded to the polymer.

11. A method as in claim 1 wherein, in the polymerization step, the monomers are dissolved in a solvent that is contained in the resulting polymer.

12. A method as in claim 1, further comprising the step of incorporating said polymer particles into a $PO_2$ sensor, a pH sensor, or a $PCO_2$ sensor.

13. A method of preparing dye-containing polymer particles, said method comprising the steps of:
   polymerizing a solution of monomers in the presence of a dye so as to produce a homogeneous bulk dye-containing polymer;
   analyzing at least a portion of said bulk dye-containing polymer so to characterize said bulk dye-containing polymer with respect to a predetermined optical property; and
   dividing said bulk dye-containing polymer so as to yield particles having the same optical property as that determined for said bulk dye-containing polymer.

* * * * *

UNITED STATES PATENT AND TRADEMARK OFFICE
CERTIFICATE OF CORRECTION

PATENT NO. : 5,286,777

DATED : February 15, 1994

INVENTOR(S) : Ulrich Schoeler et al.

It is certified that error appears in the above-identified patent and that said Letters Patent is hereby corrected as shown below:

On the title page of the patent, in field [75], change the second, third and fourth inventors' names from "Peter Ast, Schoenaich; Eugene W. Reynolds, deceased, late of Schoenaich, all of Fed. Rep. of Germany, by Beverly D. Reynolds, Administrator; Darlene J. Spira-Solomon, Stanford, Calif." to -- Peter Ast, Schonaich, both of Fed. Rep. of Germany; Eugene W. Reynolds, deceased, late of Palo Alto, by Beverly D. Reynolds, Administrator; Darlene J. Spira-Solomon, Stanford, both of Calif. --;

Column 2, line 53, "this, solution" should read -- this solution --;

Column 4, line 1, "PCO$_2$" should read -- $P_{CO_2}$ --;

Column 4, line 2, "PO$_2$" should read -- $P_{O_2}$ --;

Column 4, line 43, "PO$_2$" should read -- $P_{O_2}$ --;

UNITED STATES PATENT AND TRADEMARK OFFICE
CERTIFICATE OF CORRECTION

PATENT NO. : 5,286,777

DATED : February 15, 1994

INVENTOR(S) : Ulrich Schoeler et al.

It is certified that error appears in the above-indentified patent and that said Letters Patent is hereby corrected as shown below:

Column 4, line 44, "PCO$_2$" should read --P$_{CO_2}$ --.

Signed and Sealed this

Fifteenth Day of November, 1994

Attest:

BRUCE LEHMAN

*Attesting Officer*     *Commissioner of Patents and Trademarks*